United States Patent [19]
Bourhis

[11] Patent Number: 6,009,152
[45] Date of Patent: Dec. 28, 1999

[54] TELEPHONY DEVICE AND TELEPHONE COMMUNICATION SYSTEM INCORPORATING SUCH A TELEPHONY DEVICE

[75] Inventor: Stéven Bourhis, Change, France

[73] Assignee: U.S. Philips Corporation, New York, N.Y.

[21] Appl. No.: 08/980,129

[22] Filed: Nov. 26, 1997

[30] Foreign Application Priority Data

Dec. 6, 1996 [FR] France .................................. 96 15051

[51] Int. Cl.⁶ .................................................. H04M 11/00
[52] U.S. Cl. ............................................................ 379/93.09
[58] Field of Search ...................... 379/88.11, 88.13, 379/93.13, 88.19, 88.27, 88.28, 93.01, 142, 399, 283, 229, 93.09; 370/259, 493, 494, 76, 471, 345; 455/420, 422

[56] References Cited

U.S. PATENT DOCUMENTS

| | | |
|---|---|---|
| 4,873,719 | 10/1989 | Reese ........................................ 379/215 |
| 5,276,729 | 1/1994 | Higuchi et al. ............................ 379/58 |
| 5,423,060 | 6/1995 | Masuda et al. ......................... 455/54.1 |
| 5,488,610 | 1/1996 | Morley ..................................... 370/471 |
| 5,583,922 | 12/1996 | Davis et al. .......................... 379/93.09 |
| 5,666,357 | 9/1997 | Jangi ....................................... 370/345 |
| 5,719,922 | 2/1998 | Bremer et al. ....................... 379/93.01 |
| 5,822,406 | 10/1998 | Brown ....................................... 379/88 |
| 5,854,830 | 12/1998 | Kenmochi ............................ 379/93.09 |

*Primary Examiner*—Jack Chiang
*Attorney, Agent, or Firm*—Dicran Halajian

[57] ABSTRACT

The invention relates to a receiver stage in a telephony device which receiver stage permits of receiving and decoding coded signals distinct from the speech signals to route them to a memory area. This solution permits of a simple and automatic information transfer from the called party to the memory of the user's telephony device.

17 Claims, 2 Drawing Sheets

# TELEPHONY DEVICE AND TELEPHONE COMMUNICATION SYSTEM INCORPORATING SUCH A TELEPHONY DEVICE

FIELD OF THE INVENTION

The invention relates to a telephony device comprising at least a receiver stage for receiving call signals and speech signals, a loudspeaker for restoring sound data corresponding to said received speech signals, a keyboard for dialling directory numbers, a microphone, and a transmitter stage for transmitting call signals and speech signals which correspond to sound data sent to the microphone. This invention presents particular interest each time the keyboard is situated on the handset and is thus only visually accessible by stopping to listen to the other party.

The invention likewise relates to a telephone communication system comprising:

on the one hand, at least two telephony devices comprising each a receiver stage for receiving call signals and speech signals, a loudspeaker for restoring sound data which correspond to the received speech signals, a keyboard for dialling directory numbers, a microphone, and a transmitter stage for transmitting call signals and speech signals corresponding to sound data sent to the microphone;

on the other hand, a central switching device for establishing a two-way telephone connection between said telephony devices.

BACKGROUND OF THE INVENTION

On a growing number of currently used telephony devices, and, in essence, on mobile telephony devices, the scratchpad or electronic notebook permits the user during a conversation with his called party to enter numbers in the memory via the keyboard, for example, a telephone number he wishes to show on the screen later for calling that person. If these numbers are dictated to him, the user must listen to enter them in the memory, then stop listening to hold the telephony device in front of him and, with the keyboard, dial on the keyboard the numbers he has heard, then listen again to the numbers, put them in the memory in their turn and so on and so forth, which is evidently harmful to the continuity of the conversation. This conversation is also disturbed by the fact that, each time the user depresses a key of the keyboard, a sound signal is emitted which is annoying to the called party.

SUMMARY OF THE INVENTION

It is a first object of the invention to propose a telephony device which permits of simplifying this operation of transmitting and storing information between two persons holding a conversation.

For this purpose, the invention relates to a telephony device as defined in the opening paragraph of the description and which is furthermore characterized in that it also comprises a receiver stage for receiving separate coded signals of the speech signals received by a user during a telephone connection with at least one called party, followed by memory means for storing the information which corresponds to said coded signals.

Due to the arrangement used, completely located on the called party's telephony device, a simple and automatic solution is thus proposed for facilitating the transfer of data such as telephone numbers or other coded indications between two persons holding a conversation. Indeed, the called party no longer has to dictate said information to be transmitted and the user need not dial the thus received number on his keyboard to store the number either.

The invention proposed is applicable, whatever the type of telephone network. For example, with a telephony device for analog networks (corded, cordless, cellular analog network), said coded signals are DTMF signals (Dual Tone Multiple Frequency; these dialling tones are in accordance with Recommendation Q23) multiplexed with said speech signals, and the receiver stage for coded signals comprises a decoding circuit for decoding said DTMF signals, whereas, in the case of a telephony device according to a digital standard, said coded signals are digital signals contained in separate frames of the digital frames that contain the speech signals, and said stage comprises a decoding circuit for decoding digital signals. In either case, a microprocessor or the one built-in the telephony device controls the sending of output signals from the decoding circuit to an internal memory (scratchpad or display).

In a particular embodiment of the telephony device, the telephony device may comprise on the keyboard an additional key for neutralizing the receiver stage for receiving coded signals. It is then possible for the user to optionally oppose to the data transfer.

It is a further object of the invention to propose a telephone communication system incorporating at least a telephony device as described above.

For this purpose, the invention relates to a telephone communication system as defined in the opening paragraph of the description and which is furthermore characterized in that at least one of the telephony devices also comprises a receiver stage for receiving separate coded signals of the speech signals received during the time in which said telephony devices are connected to each other, followed by memory means for storing the data corresponding to said coded signals.

These and other aspects of the invention will be apparent from and elucidated with reference to the embodiments described hereinafter.

DESCRIPTION OF PREFERRED EMBODIMENTS

Figure 1:
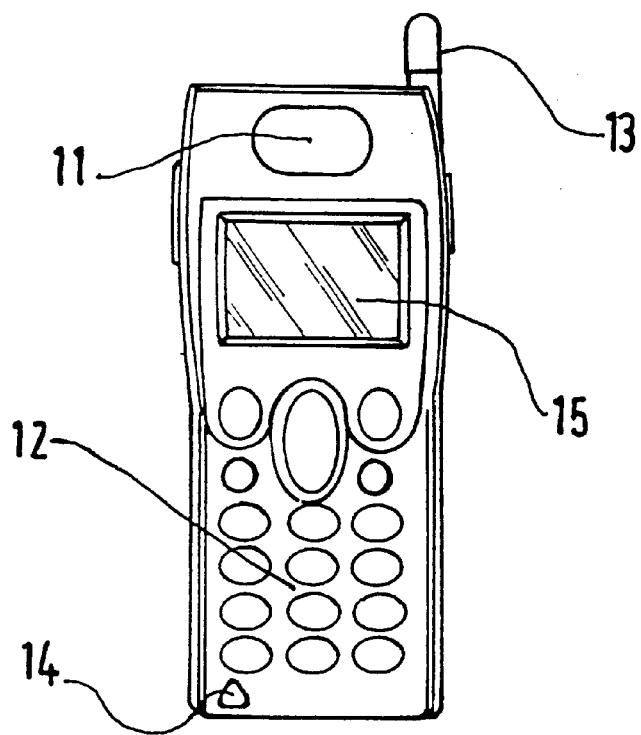
FIG. 1 shows the general structure of a telephony device according to the state of the art.

The telephony device represented in FIG. 1 in a particular embodiment is a mobile telephony device comprising, in essence, an earphone 11, a keyboard 12, an antenna 13, a microphone 14 and a screen 15. The keyboard 12 comprises at least the twelve customary keys of a telephone keyboard (keys 0 to 9, * and # keys). This telephony device also includes a microprocessor for carrying out its operation, and a RAM memory and a backup memory (for example, of the EEPROM type, Electrically Erasable Programmable Read-Only Memory).

Figure 2:
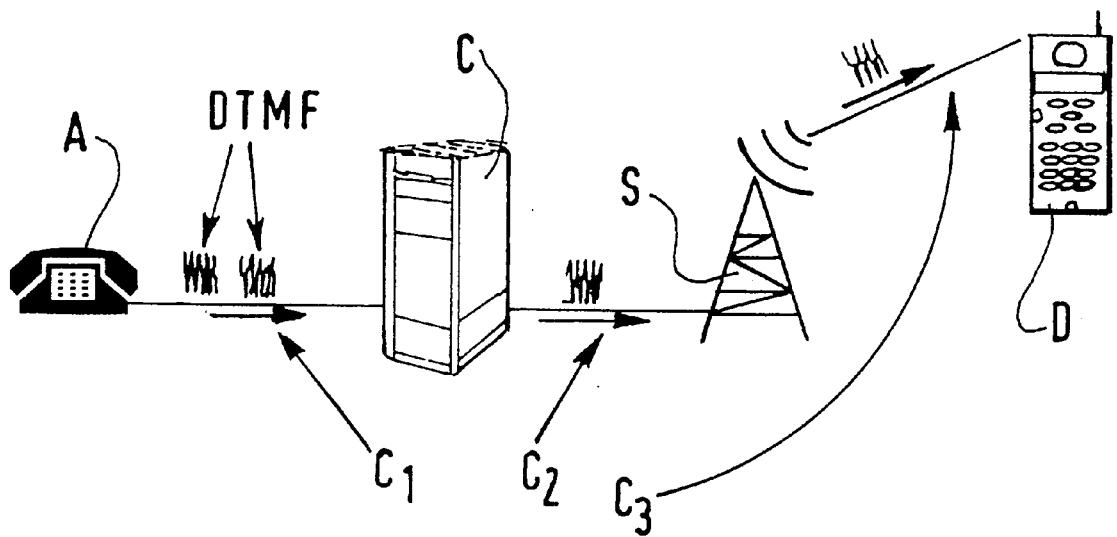
FIG. 2 illustrates the procedure of setting up a telephone call.

FIG. 2 allows of briefly recalling the procedure of setting up a telephone call. A subscriber A connected (connection $C_1$) to a telephone switching center C wishes to call a party D. The switching center C detects A's off-hook condition and directs a dialling tone to him. The subscriber dials the number of the party D and each depression of the keys of the keyboard triggers the emission of a DTMF tone. These DTMF signals are analyzed by the switching center which then searches for the destination of the call and determines to what other switching center the call is to be routed (either the center of the called telephony device, or, possibly, a relay center), then sets up the connection with it. This connection is diagrammatically represented in FIG. 2 by the itinerary (connections $C_2$, $C_3$) which connects the switching center C to the called party D, here via the intermediary of an intermediate station S. The continuity of the circuit thus established permits the DTMF signals corresponding to the called party D's number to reach his telephony device when he takes up the receiver. The propagation of these signals is represented in FIG. 2. When the called party has taken up the receiver, the conversation takes place (after a possible authentication procedure) and the speech signals then circulate in a two-way fashion between the subscriber A and his called party D.

Frequently, as has been observed above, a user (here of the telephony device described in FIG. 1) and his called party have to tell each other, for example, a telephone number or any other digital information. According to the invention, the telephony device thus comprises a specific device which completely takes charge of this data transfer in the manner to be indicated now.

Figure 3:
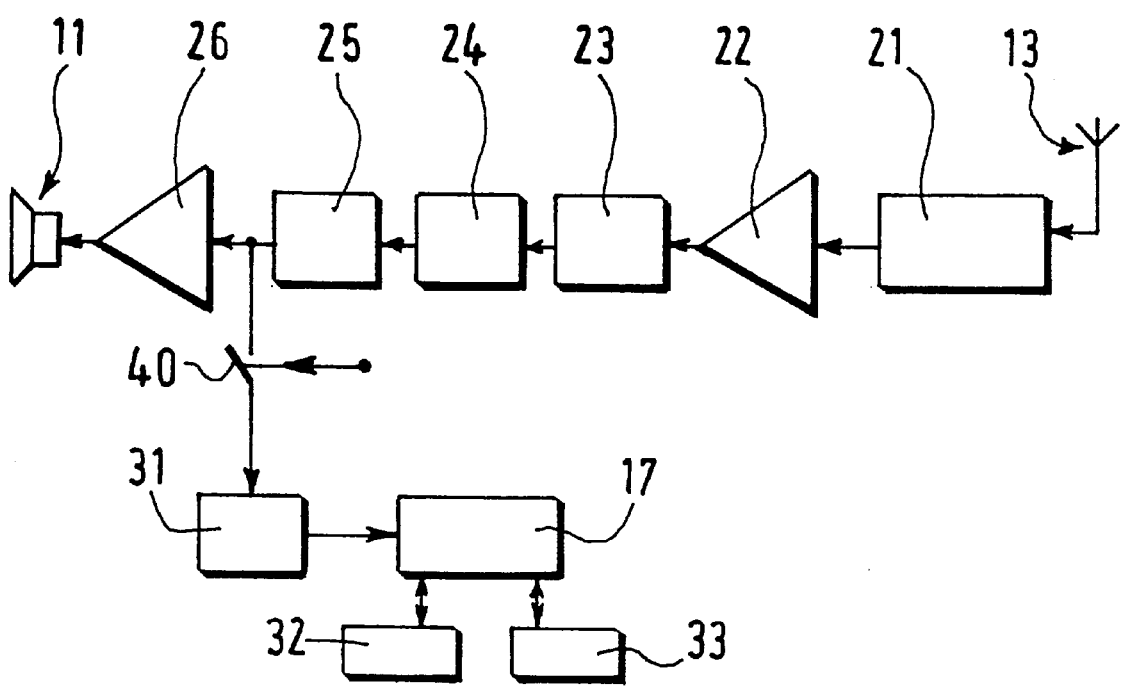
FIG. 3 shows an embodiment of a receiver stage of a telephony device which permits of implementing the invention.

As shown in FIG. 3, a telephony device as described here indeed comprises, in addition to the elements discussed above, a receiver stage connected between the antenna 13 and the earphone 11. In the case of a cellular telephony device or a cordless mobile telephony device, this stage itself conventionally comprises in a series combination a radio receiving circuit 21 for receiving speech signals, a first amplifier 22, a band-pass filter 23, a de-emphasis circuit 24, a decompression circuit 25 and a second amplifier 26. The device provided in the telephony device according to the invention comprises an additional structure in the form of a receiver stage for receiving separate coded signals of the speech signals received during the time of the telephone connection between the user and his called party (in the present case multiplexed with them). This stage, connected in parallel to the path that comprises the second amplifier 26 and the earphone 11, comprises in the present case a decoding circuit 31 for decoding DTMF signals and a microprocessor 17 (the processor that has already been provided in the telephony device suits well), a display 32 and a memory 33 (the display may be the screen 15 or an area of this screen, and the memory 33 may be an area of the memory already provided in the telephony device).

The operation of the stage is the following. When the called party, for example, wishes to transmit to the user of the telephony device thus fitted out the n digits of a telephone number, he depresses the corresponding keys of his keyboard and thus transmits during the time of the connection DTMF signals which are received and decoded by the stage according to the invention, and are thereafter directed to a memory area or to the display screen, still without the user's intervention. By thus providing a stage structure which is capable of detecting, specific coded signals in the received signals coming from the called party and transferring them to the memory, an appreciable simplification is obtained of the steps explained above, which was found to be rather complicated because of the fact that it was necessary for the user to intervene.

Of course, the invention is not restricted to this embodiment. More particularly, it is equally applicable to any telephony device of a digital type, for example, according to the GSM standard (Global System for Mobile communications) worked out by ETSI (European Telecommunications Standards Institute) or according to the DECT standard (Digital Enhanced Cordless Telecommunications), which form two types of cordless digital telephone transmission. On the other hand, this invention cannot be applied only to a conversation between two persons, but may also be implemented in conversations with more than two. In that situation, as in the situation where the user who forms the destination of the coded signals would like to oppose for whatever reason to the sending of these signals, an additional key can be provided for triggering a line interrupter, referenced 40 in FIG. 3. This control permits of neutralizing the receiver stage of the coded signals and thus of impeding the automatic transfer of coded data from the called party's telephony device to the internal memory of the user's telephony device, or of restricting the transfer to the user who accepts this transfer or for whom it is intended. Finally, the invention also relates, of course, to any telephone communication system that comprises at least two telephony devices and one switching center for setting up a connection between the two, and of which at least one of the telephony devices also comprises a receiver stage for receiving separate coded signals of the speech signals received during the time of connection between said telephony devices, followed by memory means for storing the data corresponding to said coded signals.

I claim:

1. A telephone device comprising:
    an input receiver which receives an input signal from a remote terminal, said input signal including a speech signal and a data signal;
    a data receiver which is selectively connected to said input receiver to automatically receive said data signal;
    a housing which contains said input receiver and said data receiver; and
    a switch which disconnects said data receiver from said input receiver in response to a control signal; said control signal being provided by an input key of said telephone device or by said input signal.

2. The telephone device of claim 1, wherein said data receiver includes a decoder and a memory, said decoder decoding said data signal and providing a decoded data to said memory which stores said decoded data.

3. The telephone device of claim 1, wherein said data receiver includes a decoder, a memory, and a processor, said decoder decoding said data signal and providing a decoded data to said processor for processing said decoded data and storing said decoded data in said memory.

4. The telephone device of claim 1, wherein said speech signal is a digital signal contained in frames which are distinct from frames containing said data signal.

5. The telephone device of claim 1, wherein said data signal is a DTMF signal multiplexed with said speech signal.

6. A communication system comprising:
    a plurality of telephone devices;
    a central switching device for establishing communication between at least two of said plurality of telephone devices;
    wherein one of said plurality of telephone devices includes:
        an input receiver which receives an input signal from another of said plurality of telephone devices, said input signal including a speech signal and a data signal;

a data receiver which is selectively connected to said input receiver to automatically receive said data signal;

a housing which contains said input receiver and said data receiver; and a switch which disconnects said data receiver from said input receiver in response to a control signal; said control signal being provided by an input key of said telephone device or by said input signal.

7. The communication system of claim 6, wherein said data receiver includes a decoder and a memory, said decoder decoding said data signal and providing a decoded data to said memory which stores said decoded data.

8. The communication system of claim 6, wherein said data receiver includes a decoder, a memory, and a processor, said decoder decoding said data signal and providing a decoded data to said processor for processing said decoded data and storing said decoded data in said memory.

9. The communication system of claim 6, wherein said speech signal is a digital signal contained in frames which are distinct from frames containing said data signal.

10. The communication system of claim 6, wherein said data signal is a DTMF signal multiplexed with said speech signal.

11. A telephone device comprising:

an input receiver which receives an input signal from a remote terminal, said input signal including a speech signal and a data signal;

a data receiver which is selectively connected to said input receiver to automatically receive said data signal while said input receiver is receiving said speech signal;

a housing which contains said input receiver and said data receiver; and a switch which disconnects said data receiver from said input receiver in response to a control signal.

12. The telephone device of claim 11, further comprising an input key which provides said control signal.

13. The telephone device of claim 11, wherein said control signal is provided by said input signal.

14. A wireless telephone comprising:

an input receiver which receives said input signal from a remote terminal, said input signal providing communication between said telephone and said remote terminal;

a first amplifier which amplifies said input signal to form an amplified signal;

a filter which filters said amplified signal to form a filtered signal;

a second amplifier having an amplifier input which receives said filtered signal, said second amplifier amplifying said filtered signal to form an output signal;

a data receiver which is selectively connected to said amplifier input to automatically receive said data signal during said communication; and a switch which disconnects said data receiver from said amplifier input in response to a control signal.

15. The wireless telephone of claim 14, further comprising an input key which provides said control signal.

16. The wireless telephone of claim 14, wherein said control signal is provided by said input signal.

17. The wireless telephone of claim 14, further comprising a housing which contains said input receiver and said data receiver.

* * * * *